(12) United States Patent
Shilts et al.

(10) Patent No.: US 10,860,615 B2
(45) Date of Patent: Dec. 8, 2020

(54) USERS CAMPAIGN FOR PEAKING ENERGY USAGE

(71) Applicant: Opower, Inc., Redwood Shores, CA (US)

(72) Inventors: Erik Shilts, San Francisco, CA (US); Garner Chung, Oakland, CA (US); Suelyn Yu, San Francisco, CA (US); David Royer, San Francisco, CA (US)

(73) Assignee: OPower, Inc., Redwood Shores, CA (US)

( * ) Notice: Subject to any disclaimer, the term of this patent is extended or adjusted under 35 U.S.C. 154(b) by 0 days.

(21) Appl. No.: 16/660,926

(22) Filed: Oct. 23, 2019

(65) Prior Publication Data

US 2020/0057771 A1 Feb. 20, 2020

Related U.S. Application Data

(63) Continuation of application No. 14/581,105, filed on Dec. 23, 2014, now Pat. No. 10,467,249.

(60) Provisional application No. 62/034,535, filed on Aug. 7, 2014.

(51) Int. Cl.
*G06F 16/28* (2019.01)
*G06Q 50/06* (2012.01)
*G06Q 10/04* (2012.01)
*H04L 29/08* (2006.01)

(52) U.S. Cl.
CPC .......... *G06F 16/283* (2019.01); *G06Q 10/04* (2013.01); *G06Q 50/06* (2013.01); *H04L 67/12* (2013.01); *Y02D 10/00* (2018.01)

(58) Field of Classification Search
CPC ...... G06F 16/283; G06Q 10/04; G06Q 50/06; Y02D 10/45; H04L 67/12
See application file for complete search history.

(56) References Cited

U.S. PATENT DOCUMENTS

| | | |
|---|---|---|
| 2007/0203860 A1 | 8/2007 | Golden |
| 2009/0195349 A1 | 8/2009 | Frader-Thompson |
| 2010/0049737 A1 | 2/2010 | Ambrosio |
| 2010/0191487 A1 | 7/2010 | Rada |
| 2011/0313578 A1 | 12/2011 | Jones |
| 2012/0215369 A1 | 8/2012 | Desai |
| 2013/0079938 A1 | 3/2013 | Lee |

FOREIGN PATENT DOCUMENTS

JP 2012-155385 A 8/2012

*Primary Examiner* — Etienne P Leroux
*Assistant Examiner* — Husam Turki Samara
(74) *Attorney, Agent, or Firm* — Kraguljac Law Group, LLC

(57) ABSTRACT

Aspects of the subject technology relate to a system that analyzes customers' AMI load curves, identifies evening peak users as defined by their load curves, and provides Energy Efficiency (EE) advice related to their periods of high use. For example, identified high evening users can be sent an email with normative comparisons on evening load use, along with tips to reduce energy usage. Other aspects relate to the additional targets/communications. Aspects of the subject technology relate to categorizing a user's energy consumption tendencies based on a user's load curve and providing customized content based on the user's category. By taking into consideration the user's actual energy consumption patterns, the system may be able to provide more relevant content to the user.

18 Claims, 9 Drawing Sheets

USERS CAMPAIGN FOR PEAKING ENERGY USAGE

CROSS-REFERENCE TO RELATED APPLICATIONS

The present application is a continuation of U.S. Non-Provisional application Ser. No. 14/581,105 filed Dec. 23, 2014, issued on Nov. 5, 2019 as U.S. Pat. No. 10,467,249 and claims the benefit of priority to U.S. Provisional Application Ser. No. 62/034,535, filed Aug. 7, 2014, entitled "EVENING PEAKING USERS CAMPAIGN," which is hereby incorporated by reference in its entirety.

BACKGROUND

Segmentation and targeting of users is usually done based on demographic information (e.g., age, household size, income level, rent or own, etc.) associated with the user, information about the user's property (e.g., the size of the property, the type of fuels used, thermostat set points, etc.), or the location of the user. This information can be used to guess how users consume electricity, select personalized content based on that guess, and provide the personalized content to the user.

SUMMARY

The subject technology includes computer-implemented method for implementing an evening peak user campaign, comprising: aggregating consumption data for a plurality of users, the consumption data corresponding with an amount of energy resource consumption for each of the respective plurality of users; generating, from the consumption data, at least one load curve for the plurality of users; identifying, from the at least one load curve, a subset of the plurality of users that are peak users that consume more resources during a first time period than a second time period; generating a plurality of use reports for the peak users, wherein each of the use reports provides a visual display of the consumption data for each of the peak users and energy efficiency advice related to consumption during the first time period; and providing one or more of the use reports to one or more of the peak users to reduce the amount of energy resource consumption for the one or more peak users.

The subject technology provides a computing device for implementing an evening peak user campaign, the computing device comprising: at least one processor; and memory storing instructions that, when executed by the at least one processor, cause the computing device to: aggregate consumption data for a plurality of users, the consumption data corresponding with an amount of energy resource consumption for each of the respective plurality of users; generate, from the consumption data, load curves for the plurality of users; and identify, based at least in part on the load curves, a new user that is indicated as a peak user, the new user being a different user other than the plurality of users, the new user consuming more resources during a first time period than a second time period.

The subject technology further provides a non-transitory computer readable storage medium storing instructions for implementing an evening peak user campaign on a computing device, the instructions when executed by a processor causing the processor to: aggregate consumption data for a plurality of users, the consumption data corresponding with an amount of energy resource consumption for each of the respective plurality of users; identify, based on the consumption data, usage patterns for the plurality of users; identify, from the usage patterns, a subset of the plurality of users that are peak users that consume more resources during a first time period than a second time period; generate a plurality of use reports for the peak users, wherein each of the use reports provides a visual display of the consumption data for each of the peak users and energy efficiency advice related to consumption during the first time period; and provide one or more of the use reports to one or more of the peak users to reduce the amount of energy resource consumption for the one or more peak users.

BRIEF DESCRIPTION OF THE DRAWINGS

In the following description, reference is made to the following figures, and in which are shown by way of illustration specific embodiments in which the subject technology may be practiced. It is to be understood that other embodiments may be utilized and changes may be made without departing from the scope of the subject technology.

DETAILED DESCRIPTION

Figure 1:
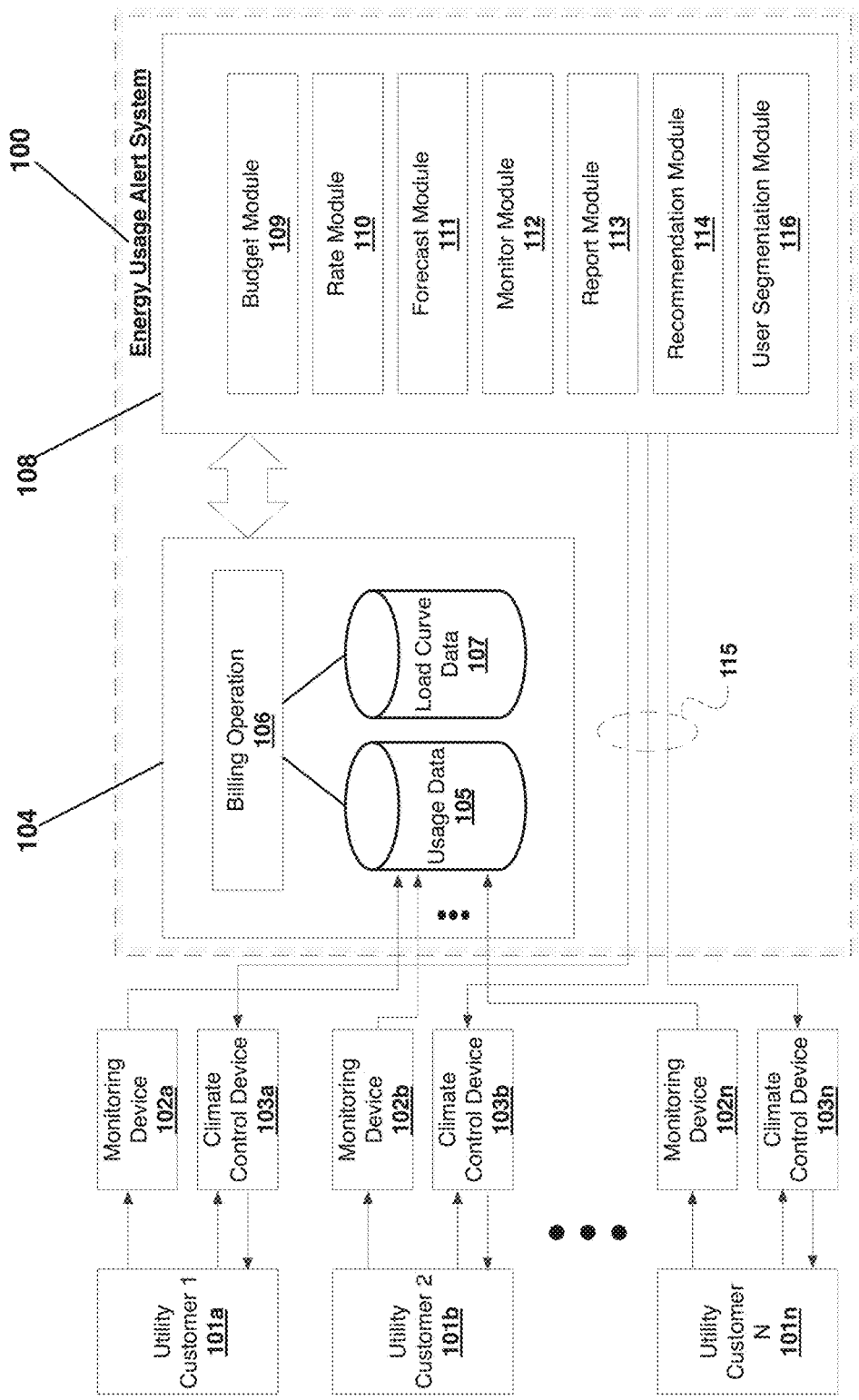
FIG. 1 illustrates an example of an energy usage alert system, according to certain aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Different consumers tend to consume resources, such as power, during different parts of the day. For example, some consumers consume resources primarily during the evening, whereas others consume resources primarily during the morning or mid-day. To be more relevant, recommendations regarding how to reduce resource consumption should be tailored based on when the consumer primarily consumes resources.

Aspects of the subject technology relate to systems and methods for analyzing customers' advanced metering infrastructure (AMI) load curves, identifying evening peak users as defined by their load curves, and providing Energy Efficiency (EE) advice related to periods of high use. For example, identified high evening users can be sent an email with normative comparisons of evening load use, along with tips to reduce energy usage. As used herein, the phrase "load curve" may refer to a graphical representation (and the underlying data that is graphically represented) that illustrates the variation in a user or utility customer's energy consumption over a specific time period. Other aspects of the subject technology relate to additional targets/communications. For example, identifying electric vehicle users based on their load curves and then providing the identified users with advice for when to charge (e.g., times with lowest rates—midnight to 6 AM) is contemplated by the embodiment of the subject technology described herein.

In one embodiment, a system of the subject technology can be configured to aggregate consumption data for a plurality of users. The consumption data can correspond with an amount of energy resource consumption for each of the respective plurality of users. AMI load curves can be generated from the consumption data and used to identify a subset of the plurality of users that are evening peak users that consume resources during evening hours. The system can generate a plurality of use reports for the evening peak users that provide a visual display of the consumption data for each of the evening peak users and energy efficiency advice related to consumption during evening hours. The generated reports can then be provided to one or more of the evening peak users to reduce the amount of energy resource consumption for the one or more evening peak users. As used herein, evening hours may corresponding to a span of hours during nighttime which, in some examples, may correspond to 6 pm-12 am or some subset therein. However, it is appreciated that evening hours may correspond to an hour(s) before 6 pm (e.g., when the evening starts at 4 pm or 5 pm) and an hour(s) after 12 am (e.g., after midnight).

Aspects of the subject technology can further relate to categorizing a user's energy consumption tendencies based on a user's load curve and providing customized content based on the user's category. By taking into consideration the user's actual energy consumption patterns, the system may be able to provide more relevant content and/or recommendations to the user.

A system may be configured to retrieve energy usage data for a user (e.g., AMI meter data) for a period of time and generate a load curve for the user for that period of time. For example, the load curve may be for a day, a week, a month, a season, or a year. In some cases, multiple sets of energy usage data may be used to generate the load curve for a defined period of time. For example, the energy usage data for the past 12 weeks may be aggregated (e.g., averaged, taking a weighted average, eliminating outlier weeks, etc.) and used to generate a weekly load curve for the user. Additional load curves (e.g., a daily load curve for weekend days, a daily load curve for weekdays or a particular weekday, a monthly load curve, load curves for the spring or summer or fall or winter season, etc.) may similarly be generated for the user.

The system may compare the one or more load curves for the user with load curve archetypes to see which load curve archetypes most closely match the load curves for the user. As used herein, a load curve archetype is a load curve that represents a type of user based on their usage patterns tracked during a period of time (e.g., a day, etc.). An example load curve archetype may include one that categorizes the user as one that has peak usage in the evening (e.g., "evening peak user"), one that has peak usage in the morning (e.g., "morning peak user"), or one that has peak usage during mid-day. The user may then be associated with an energy use profile (e.g., corresponding to a type of user) based on the load curve archetypes that the user's load curves most closely resemble. The category of the user may then be used to segment the user and provide the user with targeted content.

The "system" described herein may be implemented on a server, a climate control device, or on a computing device in communication with the climate control device. The climate control device may represent one or more of a thermostat, an application running on a computing device, or a computing device coupled to the thermostat depending on implementation. The term "usage" described herein refers to a quantity of use, a cost associated with the use, or a quantified metric representing the use or cost. The term "actual energy usage" described herein refers to a meter reading or a usage reading. The term "commodity" described herein refers to a utility-based commodity, such as electricity, water, and natural gas, which are consumable finite resources delivered to a dwelling or a commercial structure. The term "component of a property" described herein refers to a component associated with the property that is able to consume a commodity. One example of a component of a property may be a heating, ventilation and air conditioning (HVAC) system that controls the climate within the property using electricity, natural gas, and/or another commodity. The component may relate to one or more of a central heating device, a central air conditioning and heating system, an appliance, an electronic device, water heating system, a power generating device, a ventilation system, or an air filtration system.

FIG. 1 illustrates an example of an energy usage alert system 100, according to certain aspects of the subject technology. The energy usage alert system 100 includes a utility management system 104 and a billing management system 108. The utility management system 104 is coupled to utility customers 101 via monitoring devices 102 and climate control devices 103. The utility management system 104 includes usage data 105, a billing operation module 106 and load curve data 107. In an embodiment, the usage data 105 and/or the load curve data 107 are stored in respective databases, data stores, or any appropriate storage means, computer-readable medium, or mechanism for storing corresponding data and information therein. The billing management system 108 includes a budget module 109, a rate module 110, a forecast module 111, a monitor module 112, a report module 113, a recommendation module 114, and a user segmentation module 116. The billing management system 108 may convey information targeted to one or more of the utility customers 101a-101n over communication channels 115.

The utility management system 104 stores usage data in the usage data 105. The usage data is associated with one or more commodities consumed by the utility customers 101. The usage data may include usage information corresponding to usage of at least one of the one or more commodities for multiple utility customers (e.g., utility customers 101a, 101b . . . 101n). The usage-information may include past usage information of the commodity during at least one of completed billing period and a current usage of the at least one of the one or more commodities during a completed portion of a current billing period. The usage data for a utility customer may be obtained from a corresponding monitoring device on a scheduled basis, periodic basis or a non-scheduled basis. The monitoring devices (e.g., monitoring devices 102a, 102b . . . 102n) may relate to an advanced metering infrastructure (AMI). In this respect, the monitoring devices may be smart meters or, at least in part, include smart meter functionality for measuring electrical, water and/or natural gas consumption in the property associated with the corresponding utility customer. For example, the usage data may consist of usage information corresponding to the property in its entirety such that usage information relating to one or more components in the property is disaggregated by the utility management system 104 and/or the billing management system 108. In another example, the usage data 105 may contain information from non-AMI sources such as an analog meter, which is provided to the utility management system 104 by other means. In an aspect, the utility management system 104 stores and forwards the usage data to the billing management system 108 for usage alert processing. The utility management system 104 may forward the usage data to the billing management system 108 for storage and usage alert processing. The utility management system 104 described herein may refer to a utility company or an offsite third party service provider that is interfaced with the utility company.

The utility management system 104 stores load curve information in the load curve database 107. The load curve information may be based on the usage data 105. For example, the billing operation module 106 may obtain the usage data 105 to determine a load curve over a time period for the corresponding utility customer. A more detailed description of the load curve determination will be described in FIG. 2.

The budget module 109 may determine a target budget for the current billing period based on the usage data. In an aspect, the budget module 109 may include a budget advisor, which is an automated system for at least determining one or more candidate budget targets. The rate module 110 may store a local copy of a rate schedule associated with the fees for commodities provided by the utility company. The rate module 110 may be configured to obtain the rate schedule, associated with the current billing period, from the utility company or energy provider. The forecast module 111 may be configured to forecast the projected use of energy by the utility customers 101a-101n based on the corresponding usage data. The forecast module 111 may include an algorithm used to determine the projected use information using rate of use information and billing period information. The monitor module 112 may include an interface to the monitoring devices 102a-102n to obtain the usage data directly and/or include an interface with the utility management system 104 to receive the usage data for further processing by one or more components of the billing management system 108 (e.g., projected use information, rate of use information, target budgets). The report module 113 may be configured to generate a usage alert notification, and cause the usage alert notification to be sent to one or more of the utility customers 101a-101n based on one or more reporting conditions (e.g., projected bill exceeding target budget, current billing period ended, utility customer inquiry, etc.) through the communication channels 115. The recommendation module 114 may be configured to provide one or more recommendations to one or more of utility customers 101a, 101b to 101n for reducing energy usage. The user segmentation module 116 may categorize one or more utility customers 101a, 101b to 101n into different types of users based at least in part on the load curve data 107 and/or the usage data 105.

The communication channels 115 may carry alert notifications to the utility customers 101a-101n over a wired and/or a wireless communication. Further such notifications may be provided though email, Short Message Service (SMS) or interactive voice response (IVR) channels, mobile device communications, and physical mail delivery. In an aspect, the billing management system 108 sends the alert notifications in a broadcast and/or multicast signal to the utility customers 101a-101n via the climate control devices 103a-103n. The billing management system 108 may specifically target one or more of the utility customers 101a-101n, and send a personalized alert notification over a unicast signal. The communication channels 115 may be configured to interface to a customer's mobile device, a customer's computing device, another server or system, a data exchange interface of a cellular network, other networks, a smart meter (e.g., the monitoring devices 102a-102n) and/or a thermostat (e.g., the climate control device 103a-103n). It is contemplated that other devices and networks may be interfaced with the communication channels 115 and still be within the scope of the subject technology. In an embodiment, a channel such as physical delivery of correspondence (e.g., physical mail) may be utilized as well to provide messages and/or energy alerts to one or more customers.

In operation, the energy usage alert system 100 allows for the analysis of usage data 105 associated with a user to determine a load curve for the user, which may be stored as information in the load curve data 107. The load curve may represent the user's energy consumption over a specified time period (e.g., an amount of minutes, an amount of hours, an amount of days, an amount of weeks, an amount of months, etc.).

Aspects of the subject technology relate to systems and methods for analyzing customers' load curves (e.g., advanced metering infrastructure (AMI) load curves), identifying evening peak users as defined by their load curves, and providing Energy Efficiency (EE) advice related to periods of high use. For example, identified high evening users can be sent an email with normative comparisons of evening load use, along with tips to reduce energy usage. Although AMI data is used as an example, it is appreciated that other meter data with small enough granularity may be used.

Figure 2:
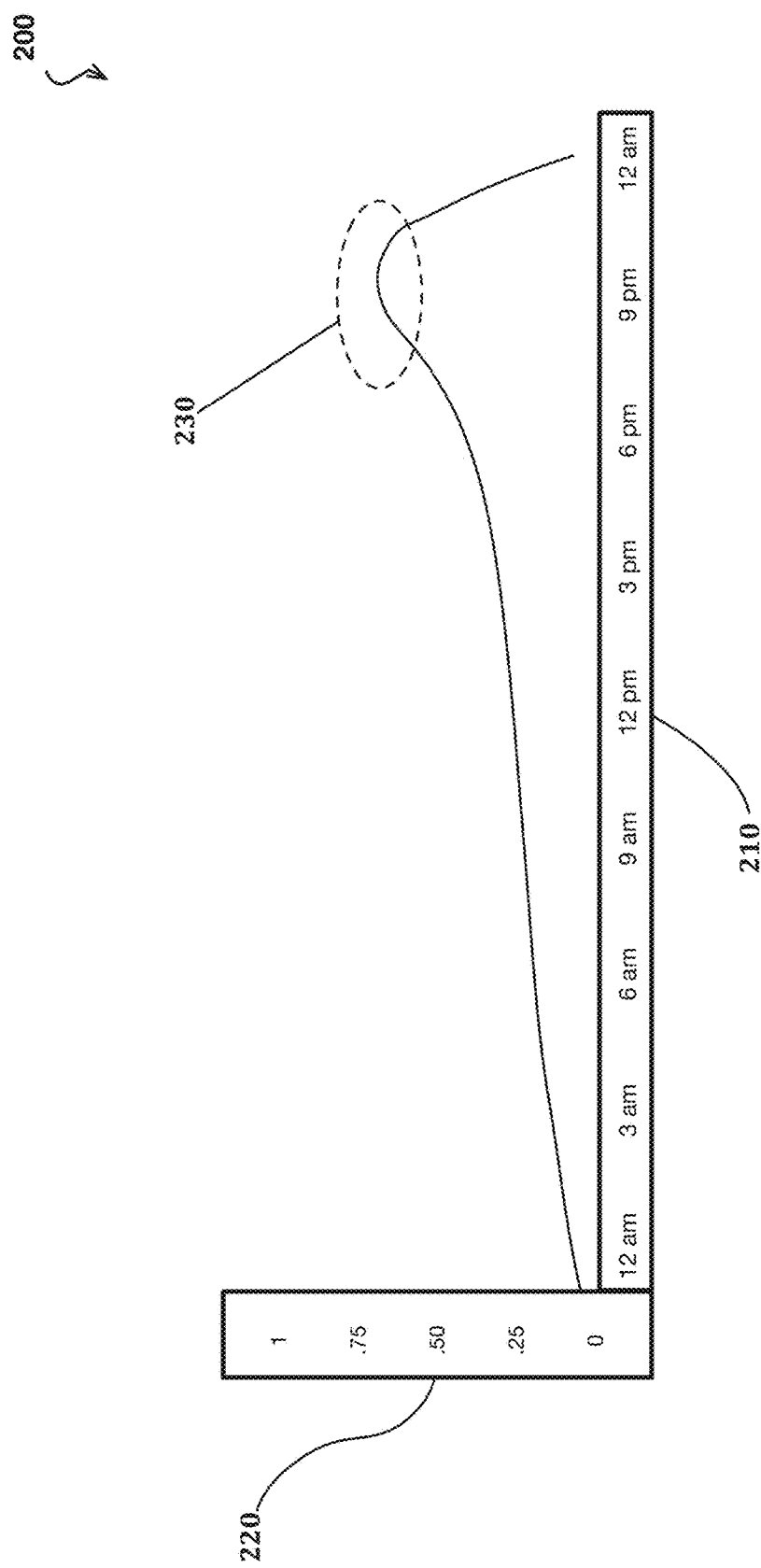
FIG. 2 illustrates an example load curve for tracking energy usage by a user over a period of time, according to certain aspects of the subject technology.

FIG. 2 illustrates an example load curve 200 for tracking energy usage by a user over a period of time, according to certain aspects of the subject technology. The aforementioned system energy usage alert system 100 may retrieve the usage data 105 corresponding to the energy usage of a user to generate a load curve representing energy consumption over a time period. As mentioned before, the usage data 105 may be AMI meter data. For example, the load curve may correspond to a time period of a day, a week, a month, a season, or a year, or any combination of the aforementioned. In some cases, multiple sets of energy usage data (e.g., consumption data) may be used to generate the load curve for a period of time. For example, the energy usage data for the past 12 weeks may be aggregated (e.g., averaged, taking a weighted average, eliminating outlier weeks, etc.) and used to generate a weekly load curve for the user. In an embodiment, the energy usage data when tracked over a period of time may form a usage pattern in which a load curve may be determined. Additional load curves (e.g., a daily load curve for weekend days, a daily load curve for weekdays or a particular weekday, a monthly load curve, etc.) may also be generated for the user.

In an example for determining a load curve, for a time period of a day, a user's energy usage may be tracked during the day for each hour, and a percentage of the total usage (e.g., a sum of usage for the respective 24 hours of the day) is determined for each hour of energy usage, producing 24 data points in the load curve. For these 24 data points, the y-axis represents the percentage of total usage at a respective hour, and the x-axis represents each of the hours in the day. Other examples may include separately or conjunctively tracking an average amount of usage for each hour, a standard deviation of usage for each hour, or baseload for each hour.

As illustrated in the example of FIG. 2, the load curve 200 is graphically represented as a percentage of total energy usage of a time period on the y-axis over the same time period on the x-axis. The time period shown for the load curve 200 in FIG. 2 is 24 hours of a day along the x-axis. The load curve 200 includes a peak portion 230 on the right portion of the graphical representation that indicates that the load curve 200 corresponds to a category of user that has peak energy usage in the evening. Further, the load curve 200 has a pattern in which the percentage of total energy usage is far less than the peak portion 230. Although, one example of a load curve for a user that has peak energy usage in the evening is shown in FIG. 2, it is appreciated that other load curves may correspond to such a user.

Although the above example discusses generating load curves, it is appreciated that the subject technology may determine usage patterns (e.g., without a corresponding visual representation) based at least in part on the energy usage data or consumption data and then determine a category of user based on such usage patterns. It is contemplated that the subject technology may utilize either a load curve or a usage pattern to categorize a utility customer or user in accordance to embodiments described herein.

Figure 3:
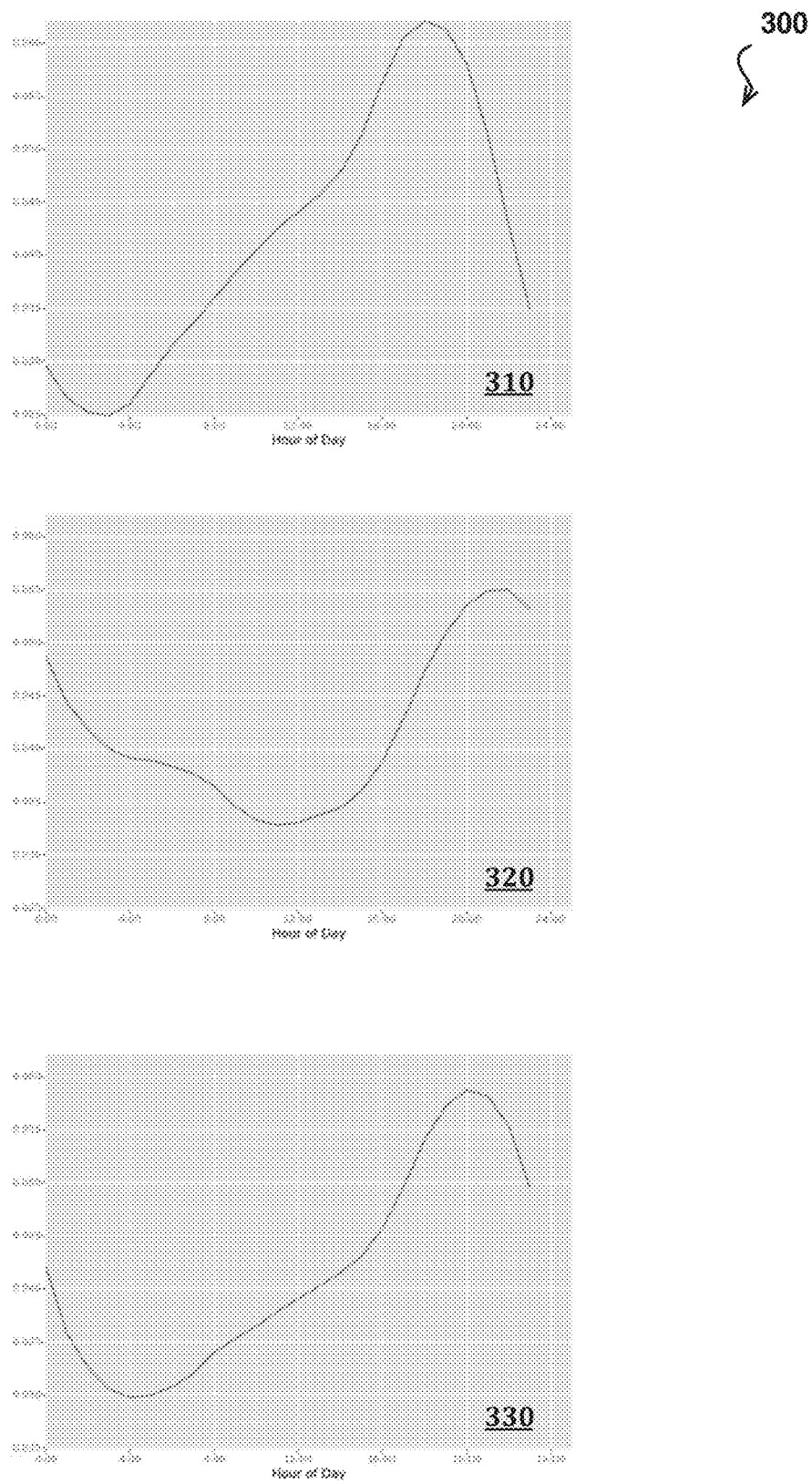
FIG. 3 illustrates different examples of load curve archetypes for representing a category of energy usage by a user over a period of time, according to certain aspects of the subject technology.

FIG. 3 illustrates different examples of load curve archetypes for representing a category of energy usage by a user over a period of time, according to certain aspects of the subject technology.

The system may be configured to generate a number of load curve archetypes by retrieving energy usage data from one or more utility providers. As discussed before, the energy usage data includes AMI smart meter data that provides energy consumption data in defined intervals (e.g., every 5 minutes, 15 minutes, every hour, etc.). In an embodiment, a clustering algorithm (e.g., a k-means algorithm) may be run on the retrieved energy usage data and used to find a number of similar users. The k-means clustering algorithm, in one example, can partition n number of observations into k number of clusters in which each observation belongs to the cluster with the nearest mean, serving as a prototype of the cluster. This results in a partitioning of the data space into Voronoi cells. A Voronoi cell may refer to a region, among multiple regions of a partitioned plane (e.g., the data space), in which the regions are partitioned based on "closeness" to points in a specific subset of the plane. Each Voronoi cell therefore may correspond to a type of user based on the users' retrieved energy usage data.

Further, load curve archetypes may also be determined through publicly available resources of daily energy usage, actual customer usage profiles, or guesses at what load curves may look like. Publicly available resources may include sources like the Energy Information Administration (EIA), or Independent Service Operators (ISOs) and Regional Transmission Organizations (RTOs).

In an embodiment, load curve archetypes may be determined from customer usage profiles. Examples of this may be clustering load curves and using the resulting centroids as archetypes. K-means clustering is a useful algorithm to discover archetypes, though other clustering algorithms may also be used. With a k-means algorithm, the number of archetypes may be selected and the k-means algorithm discovers the centroids (archetypes) that best partition the given load curves into the chosen number of groups. The centers or medians of those groups (e.g., mean or median usage at each time-interval for each group) is chosen as an archetype in an example.

As illustrated in FIG. 3, load curve archetypes 310, 320 and 330 each represent a respective archetype for a user with peak energy usage in the evening (e.g., a "peak evening user" as used herein). Each of the load curve archetypes 310, 320 and 330 include peak portions at an area of the curve representing a time period corresponding to hours in the day during the evening, while also having data points in the remaining portion of the curve with lower (and sometimes significantly lower) energy usage. In an embodiment, the load curve archetypes 310, 320 and 330 each represent a proportion of daily usage in each hour of the day, with hourly usage being the average usage in each hour for a number of days. For example, the average usage at midnight, 1 am, 2 am, etc., is determined, and then each average is divided by the sum of all the averages. By doing so, the load curves with different magnitudes and similar usage patterns may be normalized to have the same scale. Although example of load archetypes that may correspond with peak evening users are shown in FIG. 3, it is appreciated that other load archetypes for identifying different types of peak energy usage may be provided. For example load archetypes for energy usage for weekends, weekdays, seasons, etc., may be provided to further categorize a utility customer.

As mentioned before, the system may compare one or more load curves for the user with load curve archetypes to see which load curve archetypes most closely match the load curves for the user. An example load curve archetype may include one that categorizes the user as one that has peak usage in the evening (e.g., "evening peak user") or one that has peak usage in the morning (e.g., "morning peak user"). The user may then be associated with an energy use profile (e.g., corresponding to a type of user) based on the load curve archetypes that the user's load curves most closely resemble. The category of the user may then be used to segment the user and provide the user with targeted content and/or recommendations as discussed in FIGS. 4A and 4B.

Figure 4A:
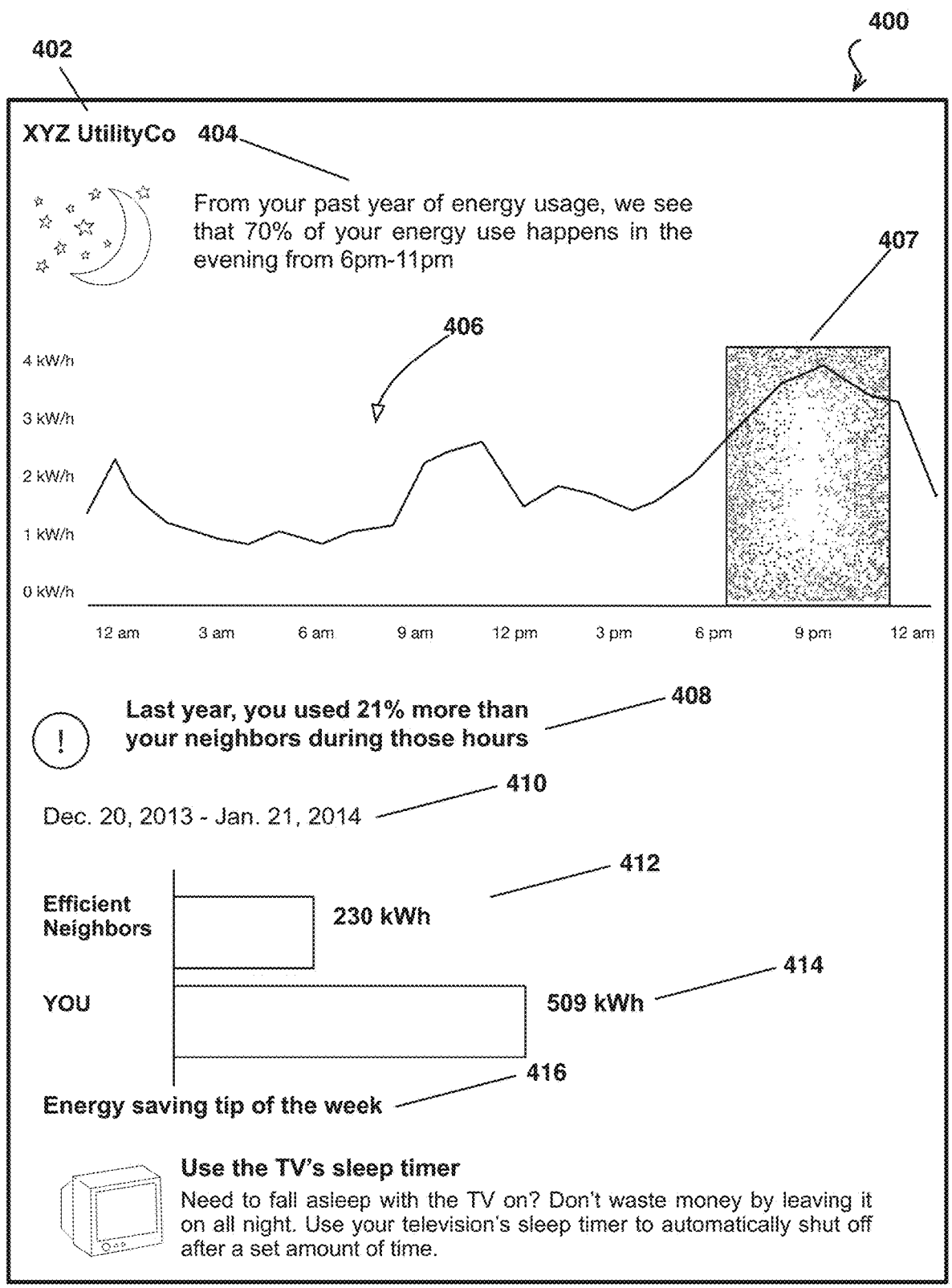
FIG. 4A illustrates an example of an energy usage alert notification provided to a utility customer, according to certain aspects of the subject technology.

FIG. 4A illustrates an example of an energy usage alert notification 400 provided to a utility customer, according to certain aspects of the subject technology. The energy usage alert notification 400 includes a utility identifier 402, a report analysis 404, a load curve 406, a second report analysis 408, a time period 410, a neighbor energy graph 412, a user energy graph 414, and a recommendation portion 416. The energy usage alert notification 400 is provided merely as an example and additional or fewer features may be included in similar or alternative formats within the scope of the various embodiments described in this specification.

The utility identifier 402 may relate to the utility company associated with the generation of the energy usage alert notification 400. The utility identifier 402 may include a name of the utility company, an address for the utility company, and/or contact information for the utility company.

The report analysis 404 may include information relating to how much energy usage (e.g., a percentage) for a prior time period (e.g., a year) that occurs within a portion of another time period (e.g., a span of hours of an evening in a day). Such information indicates to the utility customer that they may fall under a certain category of energy consumer (e.g. a morning peak user, an evening peak user, etc.).

The energy usage alert notification 400 may include additional metrics such as a chart to provide the utility customer a visual analysis of their energy usage. For example, the load curve 406 includes a graphical representation of the average energy usage or consumption (e.g., in kilowatt-hour as shown) of the utility customer over a time period (e.g., a day) that is aggregated over a longer time period (e.g., a year). The load curve 406 may be generated in accordance to the embodiments described herein. As further shown, the load curve 406 may include a highlighted portion 407 that graphically indicates an area of the load curve in which peak energy usage occurs. In this example, the highlighted portion 407 corresponds to the hours in the evening (e.g., 6-11 pm) where the peak energy usage occurred for the utility customer.

The second report analysis 408 may include information relating to how the energy usage of the utility customer compares to other customers for the time period corresponding to peak energy usage of the utility customer. Such information indicates to the utility customer whether the customer is consuming more or less energy that other customers. The other customers may correspond to one or more neighbors of the utility customer. The time period 410 may correspond to the period of time that energy usage is being analyzed for the utility customer and their neighbors.

Additionally, to facilitate visualization of such energy usage to the utility customer, the neighbor energy graph 412 and the user energy graph 414 are provided. The neighbor energy graph 412 shows a graphical representation of an amount of energy usage for neighbors of the utility customer, while the user energy graph 414 shows a graphical representation of an amount of energy usage for the utility customer. Thus, the utility customer is able to easily compare his/her energy usage to the energy usage of their neighbors.

The recommendation portion 416 may include recommendations on how to modify usage so that the utility customer reduces energy usage during the time period corresponding to a period of peak usage as indicated in the report analysis 404. The recommendations may include set points or set point schedules that may be used on the climate control device, suggestion to turn off light sources and/or electronic devices, maintenance suggestions, and specific adjustments to the climate control device, among other types of possible recommendations.

Figure 4B:
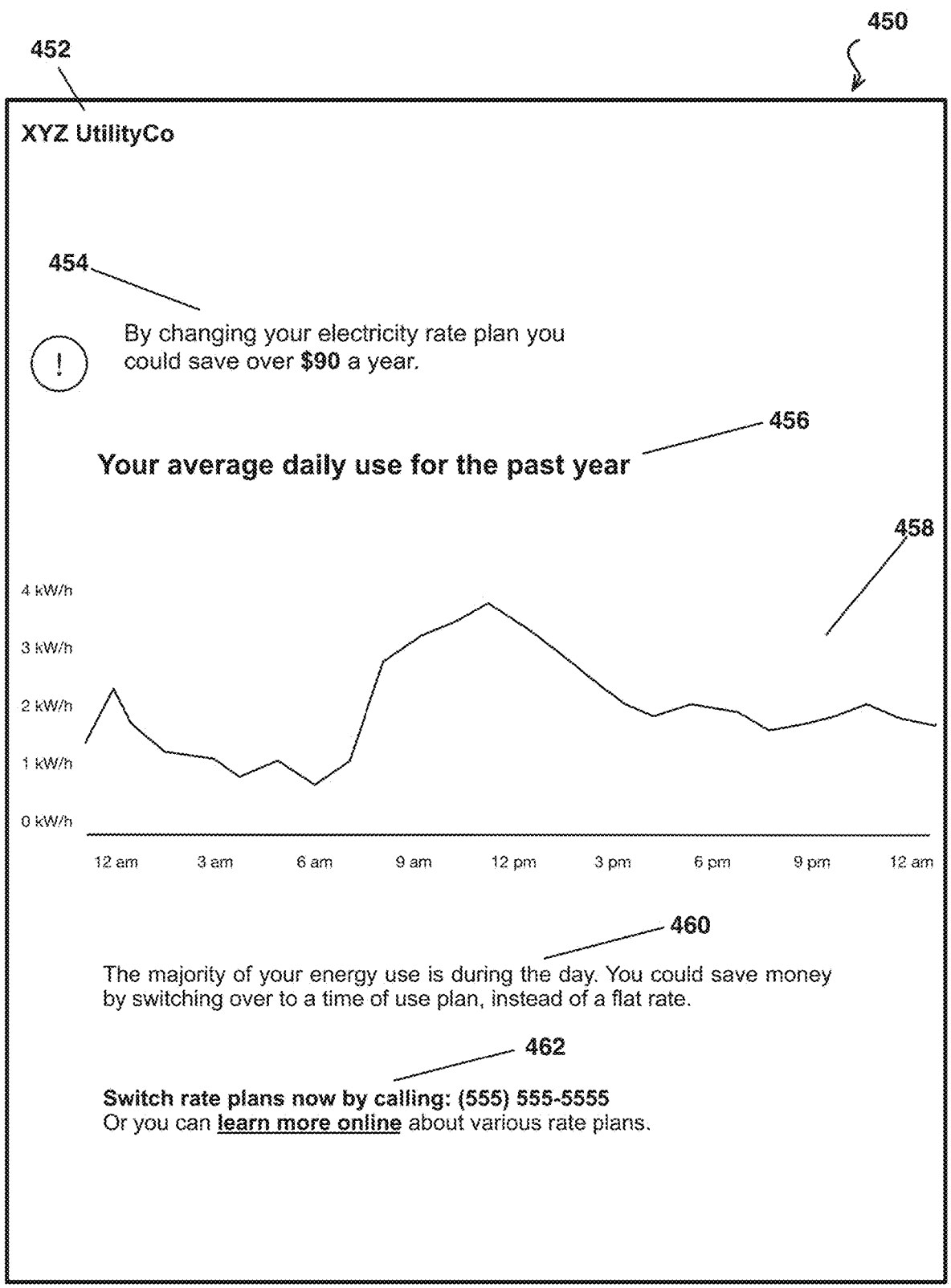
FIG. 4B illustrates an example of an energy usage alert notification provided to a utility customer, according to certain aspects of the subject technology.

FIG. 4B illustrates an example of an energy usage alert notification 450 provided to a utility customer, according to certain aspects of the subject technology. The energy usage alert notification 450 includes a utility identifier 452, a report message 454, a load curve description 456, a load curve 458, a report analysis 460, and a second report message 462. The energy usage alert notification 450 is provided merely as an example and additional or fewer features may be included in similar or alternative formats within the scope of the various embodiments described in this specification.

The utility identifier 452 may relate to the utility company associated with the generation of the energy usage alert notification 450. The utility identifier 450 may include a name of the utility company, an address for the utility company, and/or contact information for the utility company.

The report message 454 may include information suggesting to the utility customer that they could save money by switching to a different electricity rate plan. In an embodiment, providing this information may be accomplished by: calculating current costs based on current usage info (e.g., corresponding to a utility customer's load curve) and current rate plan; calculating costs for one or more alternative rate plans; comparing current cost with the cost of the one or more alternative rate plans; if an alternative rate plan is less, calculating the difference and provide the user with the content about how much the utility customer could save.

The energy usage alert notification 450 may include additional metrics such as a chart to provide the utility customer a visual analysis of their energy usage. For example, the load curve 458 includes a graphical representation of the average energy usage or consumption (e.g., in kilowatt-hour as shown) of the utility customer over a time period (e.g., a day) that is aggregated over a longer time period (e.g., a year). The load curve description 456 is further provided to indicate to the utility customer the type of usage data (e.g., average daily use for the past year) is shown in the load curve 458.

The report analysis 460 indicates that the peak usage of the utility customer occurs during a specific time period (e.g., daytime) and that money could be saved by switching over to a new type of plan instead of the current plan. The second report message 462 includes information for switching over to the new type of plan (e.g., contact information for the utility), and in an embodiment, may include a hyperlink to an external web site for the utility customer to obtain additional information.

Figure 5:
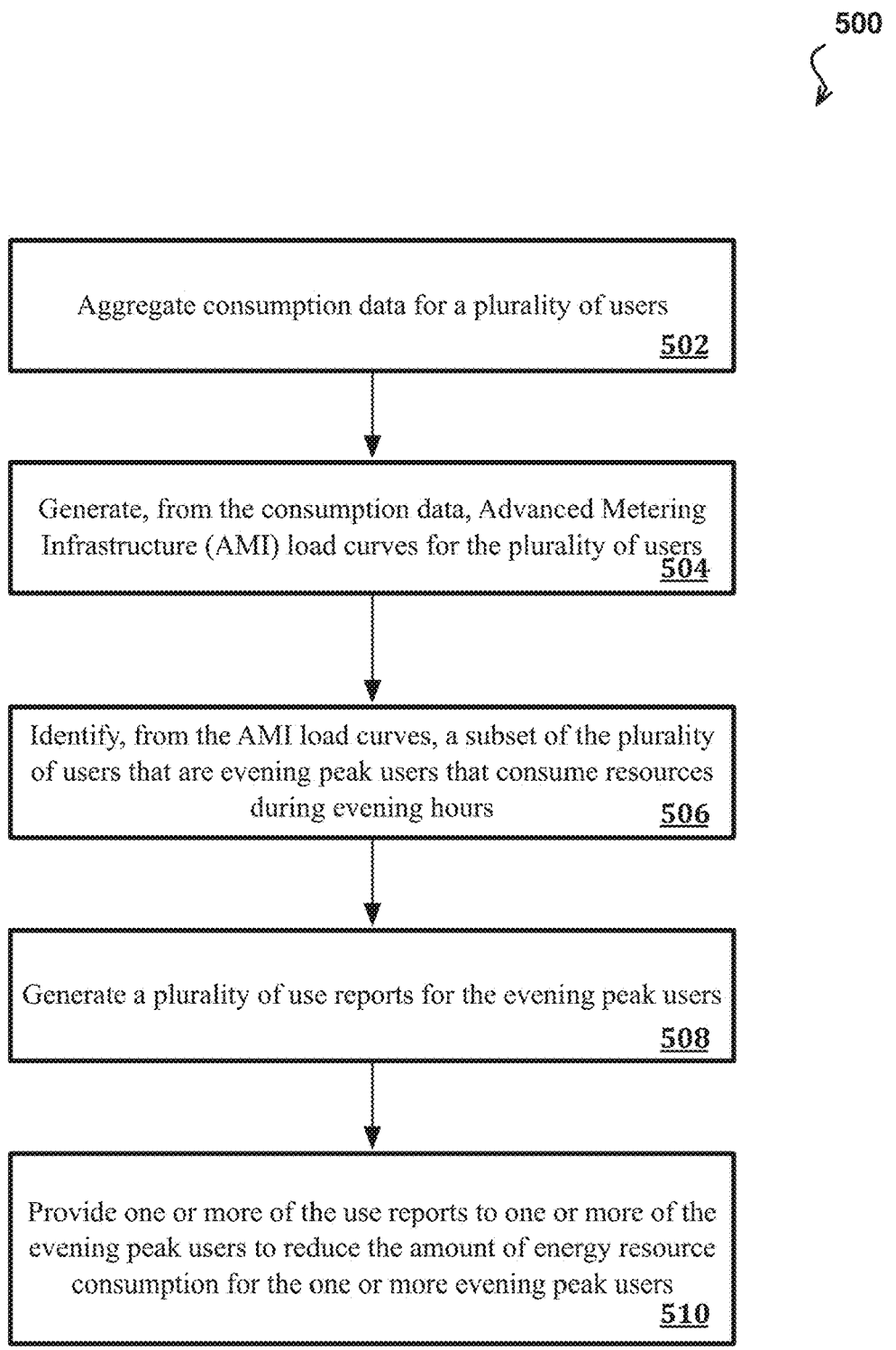
FIG. 5 illustrates a flowchart of an example process for the energy usage alert system described in FIG. 1 to provide.

FIG. 5 illustrates a flowchart of an example process 500 for the energy usage alert system described in FIG. 1 to provide. The example process 500 is provided merely as an example and additional or fewer steps may be performed in similar or alternative orders, or in parallel, within the scope of the various embodiments described in this specification.

At step 502, consumption data for a plurality of users is aggregated. In an example, the consumption data corresponding with an amount of energy resource consumption for each of the respective plurality of users. At step 504, Advanced Metering Infrastructure (AMI) load curves for the plurality of users are generated from the consumption data. In an embodiment, generating AMI load curves for the plurality of users further includes: determining one or more values measuring energy consumption at specified intervals over a specified time period, each of the one or more values at the specified intervals representing an average amount of energy usage at a specified interval of the specified time period; determining a total amount of energy usage for the specified time period; for each value measured at each specified interval over the specified time period, determining a percentage of the total amount of energy usage based on the value; and generating a graphical representation of a respective load curve based at least in part on the percentage of the total amount of energy usage at each of the specified intervals over the specified time period. The specified time period may be a day and each of the specified intervals are respective hours in the day. The values measuring energy consumption at specified intervals over the specified time period can further represent a standard deviation of usage at a respective interval, or a baseload at the respective interval.

At step 506, a subset of the plurality of users that are peak users that consume more resources during a first time period than a second time period are identified from the AMI load curves. The peak users are users that consume more resources during evening hours than other hours in a day in an example. At least one AMI curve from the AMI load curves includes a peak portion that indicates a higher usage of resources during a portion of a time period in comparison with remaining portions of the time period. In an embodiment, identifying the subset of the plurality of users that are peak users further comprises: determining one or more load curve archetypes, each load curve archetype including a respective load curve that represents a type of user based on energy consumption tracked during a period of time; and using a clustering algorithm to segment users into one or more categories based on the AMI load curves and the one or more load curve archetypes. The clustering algorithm comprises a k-means algorithm in an example.

At step 508, a plurality of use reports for the peak users are generated in which each of the use reports provides a visual display of the consumption data for each of the peak users and energy efficiency advice related to consumption during the first time period. At step 510, one or more of the use reports to one or more of the peak users to reduce the amount of energy resource consumption for the one or more peak users are provided. Each of the plurality of use reports for the peak users includes a graphical representation of a respective load curve corresponding to a respective peak user.

In another example, a peak user can be identified based on the following steps. First, consumption data is aggregated for a plurality of users, the consumption data corresponding with an amount of energy resource consumption for each of the respective plurality of users. Load curves for the plurality of users are generated from the consumption data. A new user that is indicated as a peak user is identified based at least in part on the load curves, the new user being a different user other than the plurality of users, the new user consuming more resources during a first time period than a second time period. In an example, identifying the peak user further comprises: determining one or more load curve archetypes, each load curve archetype including a respective load curve that represents a type of user based on energy consumption tracked during a period of time, and using a clustering algorithm to identify a respective user as the peak user based on a load curve of the peak user and one or more categories represented by the one or more load curve archetypes.

Further, the steps can include generating a use report for the peak user in which the use report provides a visual display of the consumption data for the peak user and energy efficiency advice related to consumption during the first time period, and providing the use report to the peak user to reduce the amount of energy resource consumption for the peak user.

In yet another example, consumption data for a plurality of users may be aggregated, the consumption data corresponding with an amount of energy resource consumption for each of the respective plurality of users. Based on the consumption data, usage patterns for the plurality of users may be identified. From the usage patterns, a subset of the plurality of users that are peak users that consume more resources during a first time period than a second time period is identified. A plurality of use reports for the peak users are generated in which each of the use reports provides a visual display of the consumption data for each of the peak users and energy efficiency advice related to consumption during the first time period. One or more of the use reports are provided to one or more of the peak users to reduce the amount of energy resource consumption for the one or more peak users.

Figure 6:
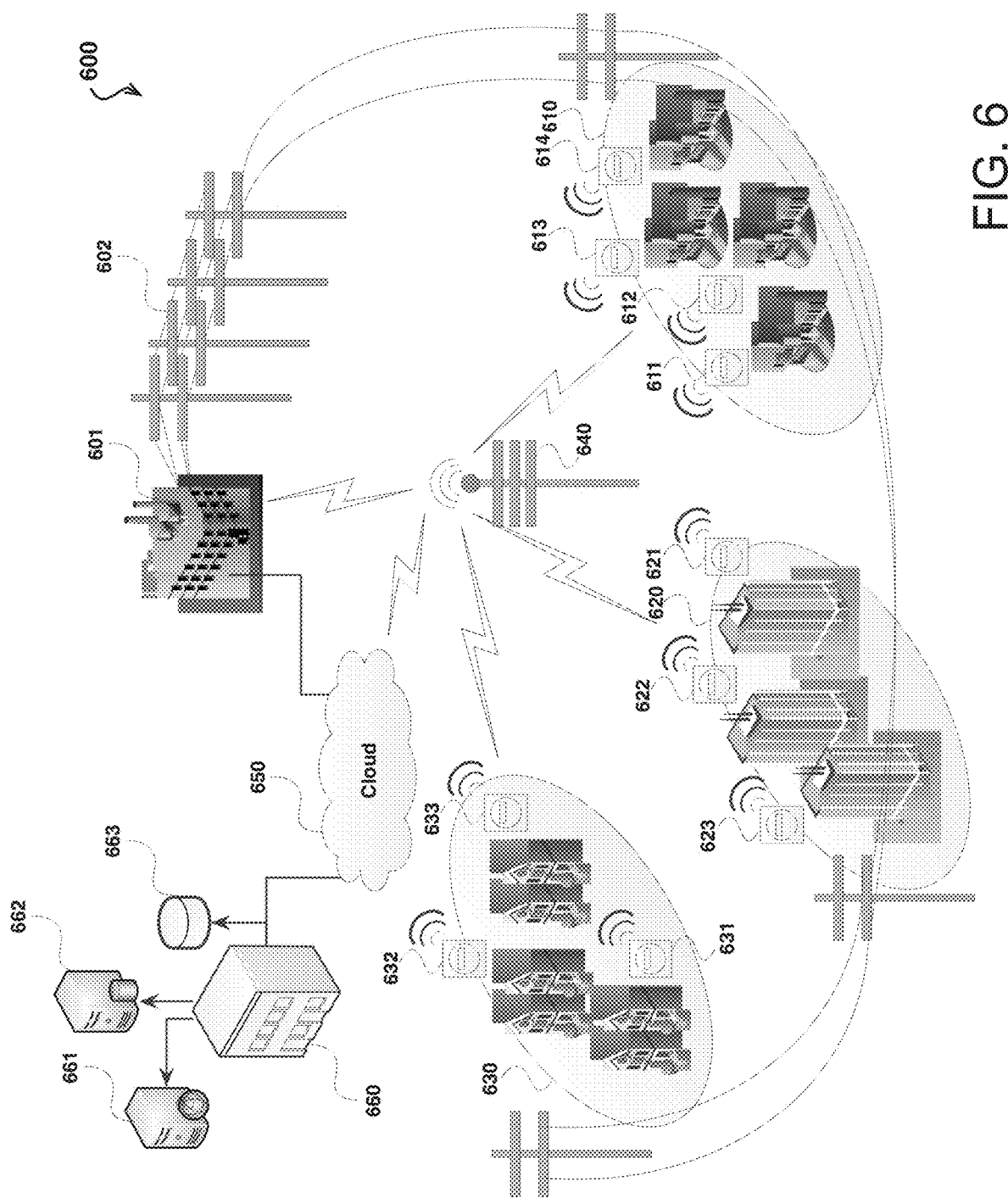
FIG. 6 illustrates an example of an environment for implementing aspects in accordance with various embodiments.

FIG. 6 illustrates an example of an environment 600 for implementing aspects in accordance with various embodiments. The environment 600 includes a utility company 601, power distribution system 602, utility customer regions 610, 620 and 630, energy usage collector 640, a network 650 and a usage alert system 660. The utility customer region 610 includes residential structures with corresponding smart meters 611-614. The utility customer region 620 includes commercial structures with corresponding smart meters 621-623. The utility customer region 630 includes multi-family structures with corresponding smart meters 631-633. The usage alert system 660 includes a web server 661, an application server 662 and a database 663.

The utility company 601 provides a commodity (e.g., electricity, gas, water) to the utility customer regions 610, 620 and 630. The utility company 601 may track the energy usage from each region via a monitoring device (e.g., a smart meter) associated with each structure of the corresponding region. The utility company 601 may receive usage data that includes the amount of energy consumption (e.g., kWH) for the corresponding utility account. In an aspect, the utility company 601 receives the usage data from the energy usage collector 640 via a wireless communication system. In some aspects, the energy usage collector 640 may obtain the usage data by pulling the usage data from each of the smart meter devices. The smart meter devices may broadcast usage data on a periodic or scheduled basis. The utility company 601 also may receive the usage data from each monitoring device through a wired communication system.

The usage alert system 660 is in communication with the utility company 601 via the network 650. The usage alert system 660 may obtain the usage data from the utility company 601 via the network 650. In an aspect, the usage alert system 660 receives the usage data via the network 650. The usage alert system 660 may receive the usage data directly from the smart meter devices.

Each of the utility customer regions 610, 620 and 630 may correspond to a separate geographical location with a respective rate schedule. In some aspects, an energy usage alert notification for a corresponding utility customer in one region may be generated using usage data of similar users in the same region to provide the corresponding utility customer with a comparative analysis of its energy consumption (e.g., current energy usage compared to similar customers in the same zip code or within a certain radius).

The usage alert system 660 also may be in communication with a third party weather service, such as the National Weather Service (not shown). For example, the usage alert system 660 may receive corresponding outdoor temperatures from the third party weather service via the network 650 (e.g., e-mails, downloaded FTP files, and XML feeds). In this respect, the usage alert system 660 may use data from the third party weather service to determine a projected use for a current billing period. For example, forecasted weather conditions (e.g., the temperature, the humidity, the barometric pressure, precipitation, etc.) may indicate that the utility customer's HVAC system is likely to be in greater use. The usage alert system 660 may estimate the projected use for the remaining amount of time of the current billing period, and thereby determine if the utility customer is on pace to exceed the projected bill based on the estimated projected use. In turn, the usage alert system 660 may notify the utility customer through an energy usage alert notification.

The usage alert system 660 communicates the energy usage alert notification to utility customers associated with the utility customer regions 610, 620 and 630. In some aspects, the usage alert system 660 communicates the energy usage alert notification via the network 650. For example, the usage alert system 660 may send the energy usage alert notification in an e-mail or the utility customer may log into the usage alert system 660 (e.g., the web server 661 and/or application server 662) through an associated website to view the disaggregated usage data included in the energy usage alert notification. The usage alert system 660 may send the energy usage information to a printing system so that the energy usage alert notification can be provided to the utility customer via regular mail (e.g., as part of a utility bill). In other embodiments, the energy usage information is communicated back to the utility company 601 such that the utility company 601 can provide the energy usage alert notification to the utility customer.

Figure 7:
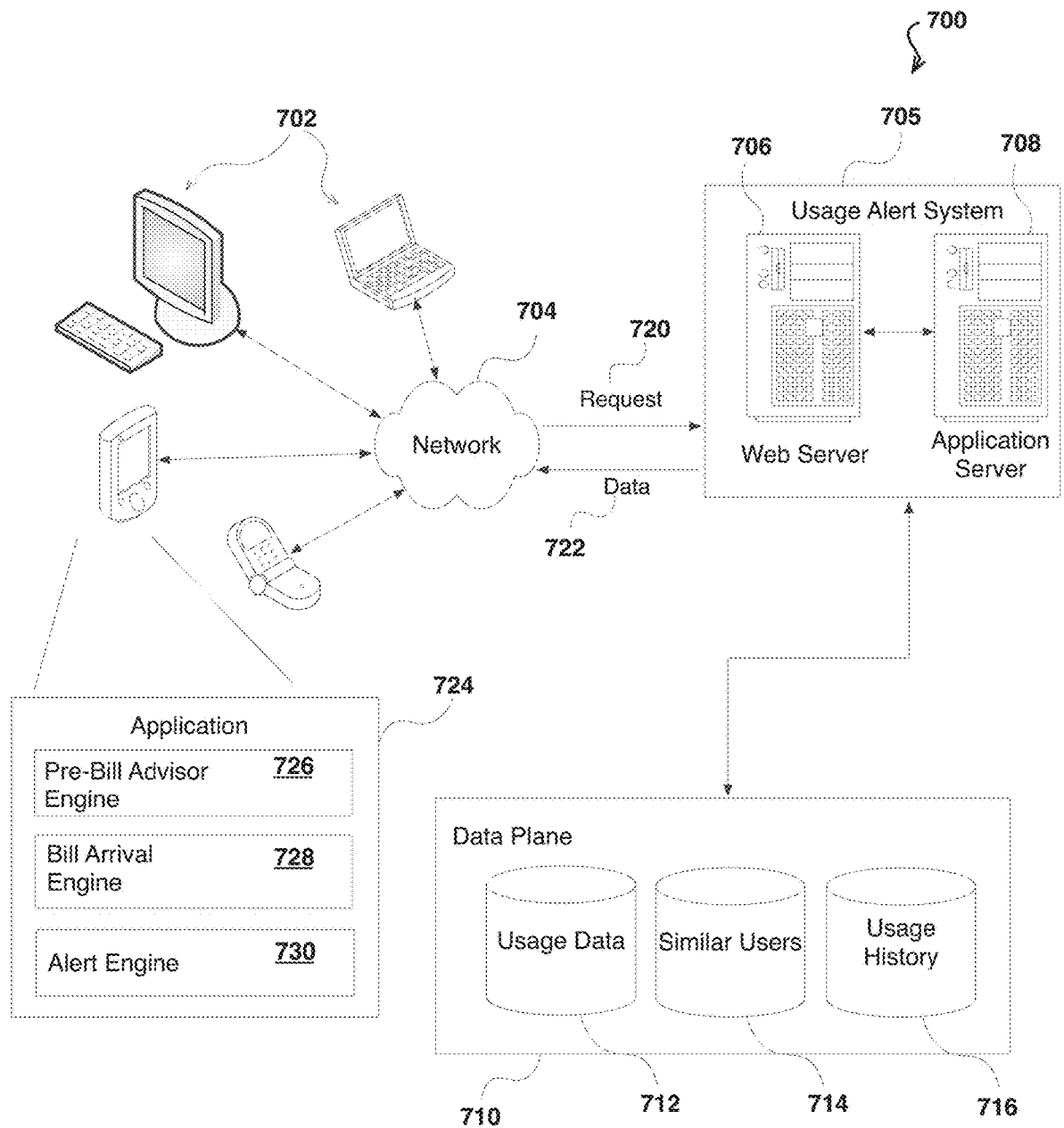
FIG. 7 illustrates an example of a system for energy usage alerts, according to certain aspects of the subject technology.

FIG. 7 illustrates an example of a system 700 for energy usage alerts, according to certain aspects of the subject technology. Although a web-based environment is described for purposes of explanation, different environments may be used, as appropriate, to implement various embodiments.

The example system 700 includes a usage alert system 705 and a data plane 710. The usage alert system 705 includes at least one web server 706 and at least one application server 708, as described below. The usage alert system 705 is an example of an energy usage notification system implemented as computer programs on one or more computers in one or more locations, in which the systems, components, and techniques described below can be implemented.

A user can interact with the usage alert system 705 through a client device 702. For example, the client device 702 can be a computer coupled to the usage alert system 705 through a data communication network 704, e.g., the Internet. In some instances, the usage alert system 705 can be implemented on the client device 702, for example, through a software application executing on the client device 702. The client device 702 generally includes a memory, e.g., a random access memory (RAM), for storing instructions and data, and a processor for executing stored instructions. The client device 702 can be any appropriate device operable to send and receive requests, messages, or other types of information over the data communication network 704. The client device 702 can also include a display screen though which the user interacting with the client device 702 can view information, e.g., energy usage alert notification 300 of FIG. 3. Some examples of client devices include personal computers, smart thermostats, cellular phones, handheld messaging devices, laptop computers, set-top boxes, personal data assistants, electronic book readers, tablet devices, smartphones and the like.

The data communication network 704 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 702 can communicate over the data communication network 704 using wired or wireless connections, and combinations thereof.

A user can use the client device 702 to submit a request 720 to log into the usage alert system 705. The request 720 can request a digital copy of an energy usage alert notification for a corresponding utility account. The energy usage alert notification may include information relating to how much energy has been consumed to date and/or a projected bill amount for a current billing period. The usage alert notification also can include information relating to one or more recommendations for adjusting settings in the property associated with the corresponding utility account such that the projected bill is kept below a target budget for the current billing period. When the user submits the request 720, the request 720 may be transmitted through the data communication network 704 to the application server 708 within the usage alert system 705. The application server 708 responds to the request 720 by using, for example, usage data 712, to identify data 722 describing an energy usage alert with personalized information in response to the request 720. The application server 708 sends the data 722 through the data communication network 704 to the client device 702 for presentation to the user.

The data 722 can include data describing a projected bill for a current billing period. The data 722 can be used, for example, by the client device 702, to generate a local energy usage alert notification with one or more interactive features such as energy consumption adjustments with corresponding utility bill projections and/or instructions for adjusting settings on a climate control device associated with the corresponding utility customer.

After receiving the data 722 from the application server 708, and through the data communication network 704, a software application, e.g., web browser or application 724, running on the client device 702 renders an interactive energy usage alert notification using the data 722. For example, a pre-bill advisor engine 726 in the application 724 can describe the usage to date including a projected use for the current billing period, for display on a display screen of the client device 702.

In some aspects, the application 724 includes a bill arrival engine 728 that is configured to render an interface to the climate control device, and perform one or more actions related to the instructions for adjusting the settings of the climate control device. In some embodiments, the bill arrival engine 728 is configured to obtain data relating to current settings of the climate control device. The bill arrival engine 728 can obtain real-time statistics and/or sensor readings (e.g., thermometer reading) of current climate conditions in the property. In an aspect, the application 724 includes an alert engine 730 that is configured to render the energy usage alert notification including allow the user to set (or program) rules and/or conditions for receiving the energy usage alert notification.

In some embodiments, the web server 706, the application server 708, and similar components, can be considered to be part of the data plane 710. The handling of all requests and responses, as well as the delivery of content between the client device 702 and the application server 708, can be handled by the web server 706. The web server 706 and the application server 708 are merely example components. However, more or fewer components can be used as structured code can be executed on any appropriate device or host machine as discussed elsewhere herein.

The data plane 710 includes one or more resources, servers, hosts, instances, routers, switches, data stores, other similar components, or a combination thereof. The resources of the data plane 710 are not limited to storing and providing access to data. Indeed, there may be several servers, layers, or other elements, processes, or components, which may be chained or otherwise configured, and which can interact to perform tasks including, for example, obtaining data from an appropriate data store. In some embodiments, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 710 can include several separate data tables, databases, or other data storage mechanisms and media for storing data relating to a particular aspect. For example, the data plane 710 illustrated includes mechanisms for storing usage data 712 and user information 716, which can be used to generate the energy usage alert notification. The data plane 710 is also shown to include a mechanism for storing similar user data 714, which can be used for purposes such as reporting a comparative analysis of the usage data for the corresponding utility customer. The data plane 710 is operable, through logic associated therewith, to receive instructions from the application server 708 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment m one embodiment is a distributed computing environment including several computer systems and components that are interconnected through one or more communication links, using one or more computer networks or direct connections. However, the system described above can be configured to operate equally well using fewer or a greater number of components than are illustrated in FIG. 7. Thus, the system 700 in FIG. 7 is provided merely as one example, and does not limit the scope of the disclosure.

Figure 8:
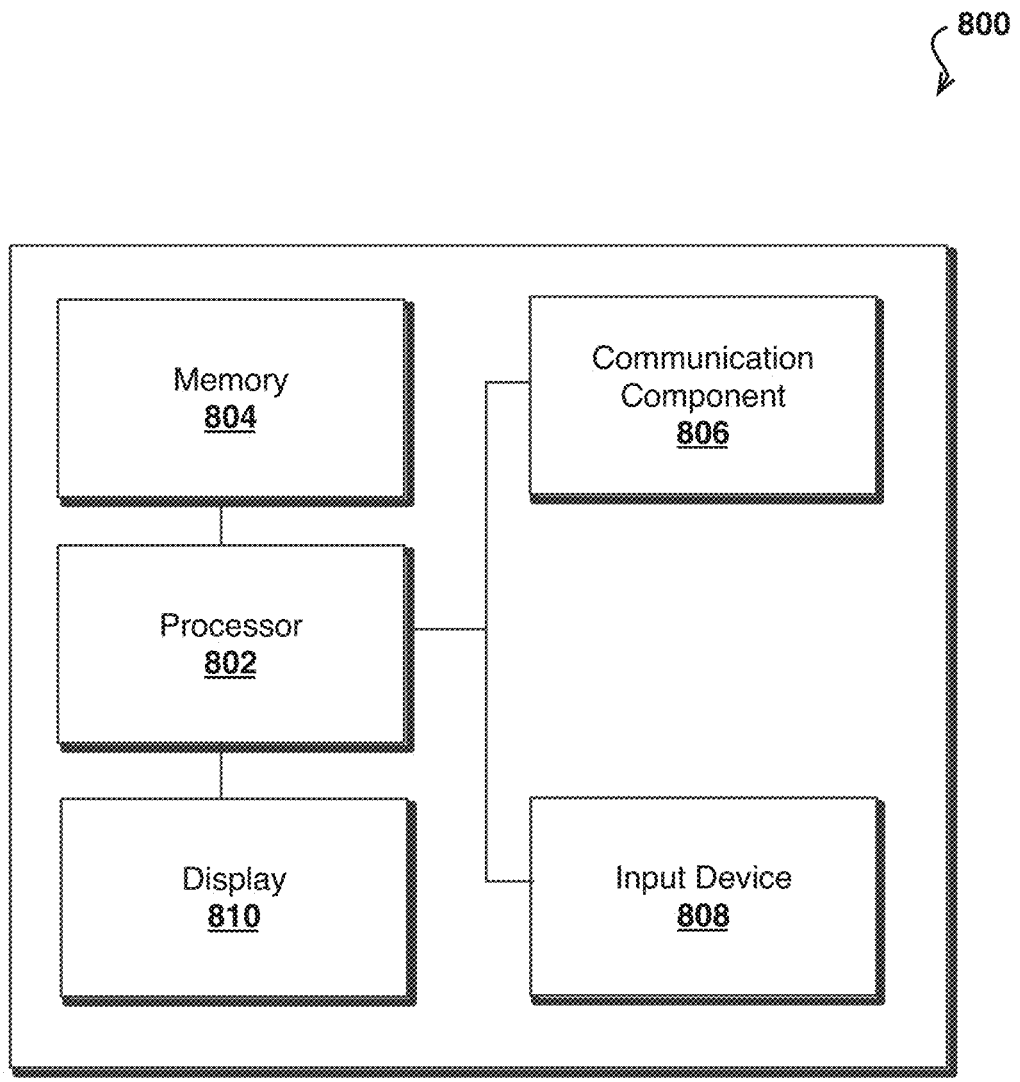
FIG. 8 illustrates an example configuration of components of a computing device, according to certain aspects of the subject technology.

FIG. 8 illustrates an example configuration of components of a computing device 800, e.g., the climate control devices 103a-103n of FIG. 1, according to certain aspects of the subject technology. In this example, the computing device 800 includes a processor 802 for executing instructions that can be stored in a memory device or element 804. The instructions may cause the computing device 800 to execute a computer-implemented method for processing energy usage alerts from the energy usage alert system 100 (FIG. 1) and/or receive instructions to automatically adjust settings (e.g., temperature settings, alarm settings, power settings) of the client computing device 800. As would be apparent to one of ordinary skill in the art, the computing device 800 can include many types of memory, data storage, or non-transitory computer-readable storage media, such as a first data storage for program instructions for execution by the processor 802, a separate storage for usage history or user information, a removable memory for sharing information with other devices, etc. In some embodiments, the computing device 800 can include one or more communication components 806, such as a Wi-Fi, Bluetooth®, radio frequency, near-field communication, wired, or wireless communication system. The computing device 800 in many embodiments can communicate with a network, such as the Internet, and may be able to communicate with other such devices (e.g., the energy usage alert system 100, other climate control devices). As discussed, the computing device 800 in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The computing device 800 includes some type of display element 810, such as a touch screen or liquid crystal display (LCD).

The various embodiments can be implemented m a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server (s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented method performed by a computer including at least a processor and a memory, the method comprising:
    aggregating, by the processor of the computer, consumption data for a plurality of users, the consumption data corresponding with an amount of energy resource consumption for each of the plurality of users;
    generating, by the processor from the consumption data, a load curve for each of the plurality of users;
    identifying, by the processor from the load curves, a set of target users from the plurality of users that consume more resources during an evening time period during a day, wherein the identifying comprises:
        comparing the load curve of each of the plurality of users to a plurality of load curve archetypes,
        wherein the plurality of load curve archetypes includes at least (i) a first archetype that categorizes the user as an evening peak user that has a peak usage in the evening time period and (ii) a second archetype that categorizes the user as a morning peak user that has the peak usage in a morning time period; and
        generating the set of target users from the plurality of users that are identified as the evening peak users based on at least comparing the load curves;
    selecting, by the processor accessing a data structure, a first recommendation from a plurality of available recommendations for the evening peak users;
    modifying, by the processor, the first recommendation to include an instruction for causing an action to be performed to adjust a setting in a climate control device to reduce resource consumption during the evening time period; and
    controlling, by the processor over a computer network based on the set of target users, transmission of each of the first recommendation in electronic form to remote devices associated with corresponding target users to cause the evening peak user to adjust the climate control device to reduce resource consumption during the evening time period.

2. The computer-implemented method of claim 1, wherein comparing the load curve includes:
associating each of the plurality of users as the evening peak user or the morning peak user based on the load curve archetype that the user's load curve most closely resembles.

3. The computer-implemented method of claim 1, further comprising:
modifying the first recommendation with a suggestion to switch from a current electricity rate plan to a different electricity rate plan based upon a load curve of a target user and rate plan data of electricity rate plans.

4. The computer-implemented method of claim 1, wherein generating load curves for the plurality of users further comprises:
determining one or more values measuring energy consumption at specified intervals over a specified time period, each of the one or more values at the specified intervals representing an average amount of energy usage at a specified interval of the specified time period;
determining a total amount of energy usage for the specified time period;
for each value measured at each specified interval over the specified time period, determining a percentage of the total amount of energy usage based on the value; and
generating a graphical representation of a respective load curve based at least in part on the percentage of the total amount of energy usage at each of the specified intervals over the specified time period.

5. The computer-implemented method of claim 4, wherein the values measuring energy consumption at specified intervals over the specified time period further represent a standard deviation of usage at a respective interval, or a baseload at the respective interval.

6. The computer-implemented method of claim 1, wherein the identifying a set of target users further comprises:
using a clustering algorithm to segment users into one or more categories based on the load curves and the plurality of load curve archetypes.

7. The computer-implemented method of claim 6, wherein the one or more categories comprise at least one of the evening peak user, the morning peak user, a mid-day peak user, or a peak user corresponding to a season within a year.

8. The computer-implemented method of claim 1, further comprising:
generating, by the processor, a use report in electronic form for each target user in the set of target users, wherein the use report for a target user provides a visual display of the consumption data for the target user; and
modifying the use report to include the first recommendation for each target user;
wherein the use report including the first recommendation is transmitted in electronic form to the remote devices associated with the corresponding target user.

9. The computer-implemented method of claim 1, comprising:
determining, by the processor, that a target user owns an electric vehicle based upon the load curve of the target user; and
modifying, by the processor, the first recommendation to further include a suggestion for charging the electric vehicle at a particular time.

10. A computing device for implementing an evening peak user campaign, the computing device comprising:
at least one processor; and
memory storing instructions that, when executed by the at least one processor, cause the computing device to:
aggregate consumption data for a plurality of users, the consumption data corresponding with an amount of energy resource consumption for each of the plurality of users;
generate, from the consumption data, a load curve for each of the plurality of users;
identifying, from the load curves, a set of target users from the plurality of users that consume more resources during an evening time period during a day, wherein the identifying comprises:
comparing the load curve of each of the plurality of users to a plurality of load curve archetypes,
wherein the plurality of load curve archetypes includes at least (i) a first archetype that categorizes the user as an evening peak user that has a peak usage in the evening time period and (ii) a second archetype that categorizes the user as a morning peak user that has the peak usage in a morning time period; and
generating the set of target users from the plurality of users that are identified as the evening peak users based on at least comparing the load curves;
select, by accessing a data structure, a first recommendation from a plurality of available recommendations for the evening peak users;
modify the first recommendation to include an instruction for causing an action to be performed to adjust a setting in a climate control device to reduce resource consumption during the evening time period; and
transmit, over a computer network, the first recommendation in electronic form to remote devices associated with corresponding target users to cause the evening peak user to adjust the climate control device to reduce resource consumption during the evening time period.

11. The computing device of claim 10, wherein a target user consumes more resources during evening hours than other hours in a day, and wherein the instructions cause the computing device to:
determine that a target user owns an electric vehicle based upon a load curve of the target user;
modify the first recommendation to include energy efficiency advice for charging the electric vehicle at a particular time.

12. The computing device of claim 10, wherein at least one load curve from the load curves includes a peak portion that indicates a higher usage of resources during a portion of a time period in comparison with remaining portions of the time period.

13. The computing device of claim 10, wherein to generate load curves for the plurality of users further comprises instructions that, when executed by the at least one processor, cause the computing device to:
determine one or more values measuring energy consumption at specified intervals over a specified time period, each of the one or more values at the specified intervals representing an average amount of energy usage at a specified interval of the specified time period;
determine a total amount of energy usage for the specified time period;

for each value measured at each specified interval over the specified time period, determine a percentage of the total amount of energy usage based on the value; and generate a graphical representation of a respective load curve based at least in part on the percentage of the total amount of energy usage at each of the specified intervals over the specified time period.

14. The computing device of claim 13, wherein the values measuring energy consumption at specified intervals over the specified time period further represent a standard deviation of usage at a respective interval, or a baseload at the respective interval.

15. The computing device of claim 10, further comprising instructions that, when executed by the at least one processor, cause the computing device to:

generate a use report in electronic form for each target user in the set of target users, wherein the use report for a target user provides a visual display of the consumption data for the target user; and modify the use report to include the first recommendation for each target user;

wherein the use report including the first recommendation is transmitted in electronic form to the remote devices associated with the corresponding target user.

16. The computing device of claim 10, wherein the identifying a set of target users user further comprises:

using a clustering algorithm to identify a respective user as a target user for inclusion within the set of target users based on a load curve of the target user and one or more categories represented by the plurality of load curve archetypes.

17. The computing device of claim 16, wherein the one or more categories comprise at least one of the evening peak user, the morning peak user, a mid-day peak user, or a peak user corresponding to a season within a year.

18. A non-transitory computer-readable medium including stored instructions that, when executed by at least one processor of a computing device, cause the computing device to:

aggregate consumption data for a plurality of users, the consumption data corresponding with an amount of energy resource consumption for each of the plurality of users;

generate, from the consumption data, a load curve for each of the plurality of users;

identifying, from the load curves, a set of target users from the plurality of users that consume more resources during an evening time period during a day, wherein the identifying comprises:

comparing the load curve of each of the plurality of users to a plurality of load curve archetypes, wherein the plurality of load curve archetypes includes at least (i) a first archetype that categorizes the user as an evening peak user that has a peak usage in the evening time period and (ii) a second archetype that categorizes the user as a morning peak user that has the peak usage in a morning time period; and generating the set of target users from the plurality of users that are identified as the evening peak users based on at least comparing the load curves;

select, by accessing a data structure, a first recommendation from a plurality of available recommendations for the evening peak users;

modify the first recommendation to include an instruction for causing an action to be performed to adjust a setting in a climate control device to reduce resource consumption during the evening time period; and transmit, over a computer network, the first recommendation in electronic form to remote devices associated with corresponding target users to cause the evening peak user to adjust the climate control device to reduce resource consumption during the evening time period.

* * * * *